Sept. 10, 1968                D. W. COLE ET AL                3,400,982
                    WHEEL BALANCER FOR DUAL TIRED VEHICLE
                             Filed June 28, 1967

INVENTORS
DONALD W. COLE
ARLAN E. MITCHELL
BEAUFORD I. WHITLOCK

ATTORNEY

United States Patent Office 3,400,982
Patented Sept. 10, 1968

3,400,982
WHEEL BALANCER FOR DUAL TIRED VEHICLE
Donald W. Cole, Fort Worth, Tex., and Arlan E. Mitchell and Beauford I. Whitlock, Stafford, Kans., assignors to AWB Manufacturing Co., Inc., Stafford, Kans., a corporation of Kansas
Filed June 28, 1967, Ser. No. 649,507
5 Claims. (Cl. 301—5)

ABSTRACT OF THE DISCLOSURE

A wheel balancer for a dual-wheeled vehicle including a ring containing freely movable balancing elements which is adapted to be concentrically mounted upon the spacer band normally employed to separate the two tire and rim assemblies of the dual array. A resilient shim is positioned between the balancer and the spacer band to urge the ring into snug accommodation within a retainer cage, and to minimize heat transfer from the wheel assembly to the balancer.

*Field of the invention.*—This invention relates to wheels, and more particularly, to weights for land wheels.

*The prior art.*—Dynamic wheel balancers utilized within the past several years typically have taken the form of an annular casing enclosing a plurality of balls or other balancing elements, together with a quantity of oil or other hydraulic fluid. With the balancer concentrically mounted on the wheel, the balls position themselves during rotation substantially diametrically opposed to the mass tending to cause imbalance of the wheel. The effect of the positioning of the balls is thus to move the center of the mass of the wheel into coincidence with the center of rotation and thus eliminate vibration and uneven operation of the wheel.

Typical efforts at providing a dynamic wheel balancer are described and illustrated by the following United States Letters Patent: 2,687,918; 2,737,420; 2,801,883; 2,853,344; 2,909,389; 3,006,690; 3,063,754; 3,166,356; and 3,202,459. U.S. Patent application Ser. No. 577,333, filed Sept. 6, 1966 for a "Ventilating Wheel Balancer" and assigned to the assignee hereof also discloses a dynamic balancer.

Summary

The present invention may be generally described as a wheel balancer assembly which includes a balancer ring adapted to be concentrically mounted on a wheel. An arcuate cage is provided for attaching the balancer ring to the wheel so that resilient spacer means positioned between the inner diameter of the ring and the wheel may urge the ring into snug engagement with the cage and minimize heat transfer from the wheel into the balancer ring.

Drawings

Figure 1:
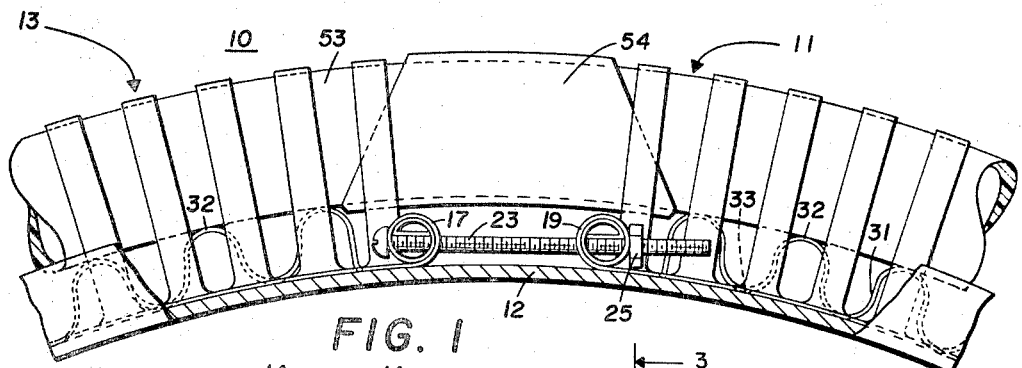
Figure 2:
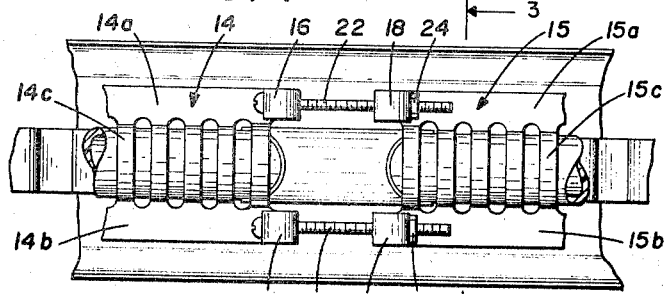

FIGURE 1 is a side elevation view of a portion of one embodiment of the present invention which has been broken away to illustrate various inventive features;
FIGURE 2 is a top plan view of the structure illustrated in FIGURE 1; and
FIGURE 3 is a cross-section along line 3—3 of FIGURE 2, to which cross-section has been added the structure of a dual tired vehicle to illustrate how the embodiments of FIGURES 1 and 2 may be mounted.

The preferred embodiment

With reference to FIGURE 1, dynamic wheel balancer 10 includes a balancer ring 11 which is attached to a conventional spacer band 12 by cage 13 which includes two generally semi-circular segments 14 and 15.
As more clearly illustrated in FIGURE 2, segment 14 of cage 13 is provided with arcuate base portions 14a and 14b which are joined by integral generally U-shaped fingers 14c. Segment 15 is provided also with arcuate base portions 15a and 15b joined by integral generally U-shaped fingers 15c. Base portions 14a and 14b are provided with curled tips 16 and 17, respectively, and base portions 15a and 15b are provided with corresponding curled tips 18 and 19. Confronting tips 16 and 18, as well as confronting tips 17 and 19 are provided with registering apertures to permit accommodation of screws 22 and 23, which together with nuts 24 and 25 serve to bind tips 16, 17, 18 and 19 in proximate abutment.

Figure 3:
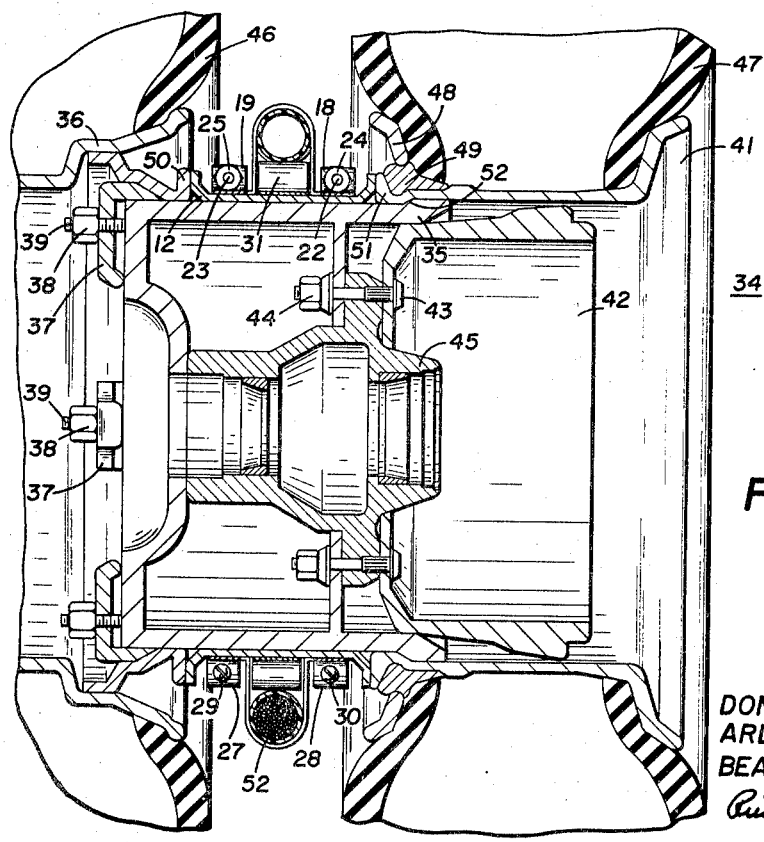

The opposite ends of each of the segments 14 and 15 are also provided with identical tips, only tips 27 and 28 of which are illustrated in FIGURE 3. Tips 27 and 28, as well as their counterparts, also receive a set of screws 29 and 30 as well as a pair of nuts (not illustrated) for binding the opposite ends of segments 14 and 15 together and thus securing balancer ring 11 to spacer band 12.

Disposed between balancer ring 11 and spacer band 12 is a resilient spacer means such as corrugated shim 31, the crests 32 of which engage the inner diameter of ring 11 and the valleys 33 of which contact the band 12. Wheel balancer 10, as more clearly illustrated in FIGURE 3 is adapted to be disposed concentrically about a dual tired wheel assembly 34. Conventional wheel assembly 34 includes a wheel 35 which has mounted thereto an outer rim 36 which is secured in place by clamps 37 and nuts 38 which engage bolts 39 extending from wheel 35. Wheel 35 also carries an inner rim 41 which is held to wheel 35 by force, exerted through band 12 and outer rim 30 and applied by clamps 37 and nuts 38 engaging bolts 39 and acting against the 28° mounting bevel 52. A brake drum 42 is also secured to wheel 35 by studs 43 and nuts 44. Outer rim 30 has mounted thereon a tubeless tire 46 and inner rim 41 is shown with a conventional tire 47 which is retained at its inner edge by side ring 48 and lock ring 49. Inner rim 41 may also be constructed with a similar base but equipped with a single combination side and lock ring.

FIGURE 3 is a composite of a dual tired assembly mounted on a conventional cast wheel 35 to indicate that either a drop center rim 36 with a tubeless tire 46 or a flat-base rim 41, with conventional tire 47 may be incorporated in the same assembly. Either tire and rim assembly will function in the inner or outer position or the dual assembly may be made up with like rims at the inner and outer positions, providing the diameters of the respective tires are within the accepted tolerance. Band 12 is secured from rotation relative to wheel 35 by frictional abutment with the lip 50 of rim 36 and lip 51 of rim 41. During operation, the temperature of wheel 35 will increase due to frictional engagement between the tire 46 and 47 and a road surface as well as heat generated in brake drum 42 which will be conducted through wheel 35 into band 12. The spacer means or shim 31 serves not only to insure snug accommodation of balancer ring 11 with cage 13, but additionally serves to minimize heat transfer between wheel 35, band 12 and balancer ring 11. Heat transfer into balancer ring 11 of an excess nature could cause warping or failure of balancer ring 11, affecting its ability to balance the wheel assembly 34. The balancer ring 11 is a conventional elongated tube 53 shaped in the form of a ring and joined by a sleeve 54 which may be cemented onto tube 53 by any suitable adhesive. Ring 11 includes conventional weight means such as shot or steel balls 52 as well as a conventional damping fluid such as ethylene glycol, brake fluid or transmission fluid.

Heat transfer between wheel 35 and balancer ring 11 is also minimized by cage segments 14 and 15 since fingers 14c and 15c provide only a minimum area through which heat may flow and also permit air circulation around corrugated shim 31 to carry away heat conducted through shim 31.

Wheel balancer 10 may be installed by first removing outer rim 36. The spacer means or shim 31 is then placed about band 12 and the ring 11 placed over the shim 31. Next, the segments 14 and 15 of cage 13 are positioned over ring 11 and screws 22, 23, 29 and 30 placed through apertures in tips 16, 17, 18, 19, 27, 28 and the two tips not illustrated. Nuts 24 and 25, and their counterparts (not illustrated) at the opposite ends of segments 14 and 15 are applied and cage 13 tightened by manipulations of the screws 22, 23, 29 and 30. The outer rim 36 is then replaced and the wheel assembly 34 is ready for use. While a variety of materials may be employed in manufacture of balancer 10, the balancer ring 11 is preferably formed of a plastic to reduce noise generated by the weight means 52, which may assume various forms, and the cage 13 and shim 31 are preferably constructed of a metal to give strength and resist deformation under high and low temperature conditions.

The present invention may also be adapted for use with Budd type dual wheels which are self spacing because of their convex discs, and various other modifications will suggest themselves to those skilled in the art after a reading of the above description. While rather specific terms have been used to describe one embodiment of the invention, they are not intended, nor should they be construed as limitations upon the invention as defined in the following claims.

We claim:
1. A dynamic wheel balancer, comprising:
    a balancer ring adapted to be concentrically mounted on a dual rim spacer band;
    an arcuate cage adapted to be placed over said ring for attaching said ring to said spacer band;
    resilient spacer means adapted to be positioned between the inner diameter of said ring and said spacer band for urging said ring into snug engagement with said cage and for minimizing heat transfer from said spacer band into said balancer ring.

2. The assembly of claim 1, wherein said balancer ring is circular in cross-section and said cage comprises:
    two substantially semi-circular segments, each segment having base portions joined by integral upstanding U-shaped fingers which are adapted to receive the balancer ring therewithin.

3. The assembly of claim 2, wherein said resilient spacer means comprises:
    a serpentine shaped ribbon, the crest of which engages the inner diameter of the balancer ring and the valleys of which are disposed proximate said spacer band.

4. The assembly of claim 3, wherein the base portions at both ends of both of said semi-circular segments are provided with apertures for receiving screws therethrough; the apertures in the confronting ends of said segments upon assembly are in a registering relationship and the assembly includes:
    screws adapted to be passed through said apertures; and
    nuts adapted to be placed about said screws to permit said screws to secure said semi-circular segments about said spacer band.

5. The assembly of claim 1, wherein said resilient spacer means comprises:
    a serpentine shaped ribbon the crest of which engages the inner diameter of the balancer ring and the valleys of which are disposed proximate said spacer band.

References Cited

UNITED STATES PATENTS

| 1,855,645 | 4/1932 | McIntosh | 248—63 X |
| 3,168,348 | 2/1965 | Fleming | 301—13 X |
| 3,191,997 | 6/1965 | Colvert | 301—5 |
| 3,314,726 | 4/1967 | Rehnborg | 301—5 |

FOREIGN PATENTS

| 280,920 | 6/1928 | Great Britain. |

RICHARD J. JOHNSON, *Primary Examiner.*